United States Patent
Wang et al.

(10) Patent No.: US 11,248,952 B2
(45) Date of Patent: Feb. 15, 2022

(54) FIBER DISTRIBUTED ACOUSTIC SENSING SYSTEM

(71) Applicant: Laser Institute of Shandong Academy of Science, Jining (CN)

(72) Inventors: Chen Wang, Ji'nan (CN); Ying Shang, Ji'nan (CN); Wenan Zhao, Ji'nan (CN); Chang Li, Ji'nan (CN); Bing Cao, Ji'nan (CN); Sheng Huang, Ji'nan (CN); Jiasheng Ni, Ji'nan (CN); Chang Wang, Ji'nan (CN)

(73) Assignee: Laser Institute of Shandong Academy of Science, Jining (CN)

( * ) Notice: Subject to any disclaimer, the term of this patent is extended or adjusted under 35 U.S.C. 154(b) by 404 days.

(21) Appl. No.: 16/567,339

(22) Filed: Sep. 11, 2019

(65) Prior Publication Data
US 2021/0048337 A1 Feb. 18, 2021

(30) Foreign Application Priority Data
Aug. 13, 2019 (CN) .......................... 201910743754.9

(51) Int. Cl.
*G01D 5/34* (2006.01)
*G01H 9/00* (2006.01)
*G01D 5/353* (2006.01)

(52) U.S. Cl.
CPC ............. *G01H 9/004* (2013.01); *G01D 5/344* (2013.01); *G01D 5/35387* (2013.01)

(58) Field of Classification Search
CPC .... G01H 9/004; G01D 5/344; G01D 5/35387; G01D 5/35316
See application file for complete search history.

(56) References Cited

U.S. PATENT DOCUMENTS
2020/0370950 A1* 11/2020 Ip ........................... G01B 11/18

FOREIGN PATENT DOCUMENTS
FR 3098659 A1 * 1/2021 ......... G01D 5/35335

* cited by examiner

*Primary Examiner* — Tony Ko
(74) *Attorney, Agent, or Firm* — Bret E. Field; Bozicevic, Field & Francis LLP

(57) ABSTRACT

The present application discloses a fiber distributed acoustic sensing system, including a forward pump source, a wavelength division multiplexer, an active phase-shifted grating array, a backward pump source, and a data demodulation and processing device. The active phase-shifted grating array includes several active phase-shifted gratings engraved on a same fiber, each active phase-shifted grating having a same excitation light wavelength. The active phase-shifted grating array is configured to receive a forward pump pulse and a backward pump light pulse incident from the backward pump source, so that a forward excitation light and a backward excitation light are generated in each active phase-shifted grating, and two adjacent active phase-shifted gratings are enabled to generate excitation light self interference within a same pulse duration. The data demodulation and processing device is configured to perform interference detection on a fiber phase between two adjacent active phase-shifted gratings to detect an acoustic signal acted on the fiber. According to the system in the present application, the passive reflected light interference is replaced with active excitation light interference, thus the excitation light signal has great strength and high stability, and environmental adaptability is high.

9 Claims, 2 Drawing Sheets

FIBER DISTRIBUTED ACOUSTIC SENSING SYSTEM

FIELD OF THE INVENTION

The present application relates to fiber sensing technologies, and in particular to a fiber distributed acoustic sensing system.

BACKGROUND OF THE INVENTION

An acoustic detection technology is a sensing technology for detecting and monitoring an acoustic signal, and can collect, in a real-time manner, a vibration frequency, a phase, and an amplitude of an acoustic vibration that varies quickly. The acoustic detection technology based on fiber sensing has advantages of wide frequency band, high sensitivity, high temperature resistance, not being interfered by an electromagnetic field, and the like. Thus, the acoustic detection technology based on fiber sensing is widely applied to the exploiting of natural gas and petroleum; to the health monitoring of civilian facilities, such as bridges, large buildings, and other civil engineering; and to the fields of military, national defense, and the like. Among them, a fiber distributed acoustic sensing technology gradually becomes focus of fiber sensing researches owing to its advantages of large scope, good bang-for-buck, high information obtaining efficiency, and the like.

According to different sensing fibers, existing fiber distributed acoustic detection systems mainly are classified into two types: one is using a narrow-linewidth distributed feedback-fiber laser (DFB-FL) as a light source, and by using backward Rayleigh scattering in a fiber, a Rayleigh scattering light returned at a different time corresponds to different positions on the sensing fiber, and the external sound field information at different positions is obtained through phase demodulation; and the other is using the narrow-linewidth distributed feedback-fiber laser (DFB-FL) as a light source, and by using passive identical weak fiber gratings, a large amount of passive identical weak fiber gratings whose reflectivities are less than one thousandth are inserted in the fiber to replace the Rayleigh scattering, thereby significantly enhancing stability of backward scattering light.

However, according to the foregoing first solution, Rayleigh scattering in the fiber has disadvantages that it is essentially a random process, in which the strength is weak, and there exists problems such as random fluctuations. Although demodulation stability can be improved through phase demodulation technology, problems such as polarization fading still exist. Moreover, according to the foregoing second solution, the passive identical weak fiber grating has a disadvantage that a reflection wavelength thereof is easily affected by a local temperature and a stress to be drifted. In a case that a length of an incident light is remained, "voids" may easily occur to the reflected light at some positions on the fiber. In this case, the external sound field signals at these positions cannot be collected and demodulated, thus the environmental adaptability in this solution is weak. Therefore, a fiber distributed acoustic sensing system that has great signal strength, stable signals, and high environmental adaptability is urgently demanded.

SUMMARY OF THE INVENTION

To resolve the foregoing problems, present application provides a fiber distributed acoustic sensing system.

The present application provides a fiber distributed acoustic sensing system, comprising a forward pump source, a wavelength division multiplexer, an active phase-shifted grating array, a backward pump source, and a data demodulation and processing device, wherein the wavelength division multiplexer is configured to receive a forward pump pulse incident from the forward pump source, transmit the forward pump pulse to the active phase-shifted grating array, and transmit an excitation light signal fed back by the active phase-shifted grating array to the data demodulation and processing device;

the active phase-shifted grating array comprises several active phase-shifted gratings that are engraved on a same fiber, each active phase-shifted grating having a same excitation light wavelength;

the active phase-shifted grating array is configured to receive the forward pump pulse and a backward pump light incident from the backward pump source, so that a forward excitation light and a backward excitation light are generated in each of the active phase-shifted gratings, and two adjacent active phase-shifted gratings are enabled to generate excitation light self-interference within a same pulse duration; and the data demodulation and processing device is configured to perform interference detection on a fiber phase between two adjacent active phase-shifted gratings to measure an acoustic signal acted on the fiber.

Optionally, a theoretical length l of the forward pump pulse is greater than a distance $\Delta l$ between each of the active phase-shifted gratings in the active phase-shifted grating array, where $l=cw/2n_f$, c represents a speed of light in vacuum, w represents a pulse width of the forward pump pulse, and $n_f$ represents a refractive index of the fiber.

Optionally, the excitation light self-interference comprises that:

when a transmittance window of an $i^{th}$ active phase-shifted grating overlaps or partially overlaps with that of a $(i+1)^{th}$ active phase-shifted grating, the backward excitation light of the $i^{th}$ active phase-shifted grating interferes with that of the $(i+1)^{th}$ active phase-shifted grating, where $1<i \leq N$, and N represents a total number of the active phase-shifted gratings included in the active phase-shifted grating array.

Optionally, the excitation light self-interference comprises that:

when a transmittance window of an $i^{th}$ active phase-shifted grating does not overlap with that of a $(i+1)^{th}$ active phase-shifted grating, the backward excitation light of the $i^{th}$ active phase-shifted grating interferes with the forward excitation light of the $i^{th}$ active phase-shifted grating reflected by the $(i+1)^{th}$ active phase-shifted grating, where $1<i \leq N$, and N represents a total number of the active phase-shifted gratings included in the active phase-shifted grating array.

Optionally, the data demodulation and processing device comprises a coupler, an interferometer, three master detectors, and a data collection and processing module; an input of the master detector is connected to a port at a first side of the coupler; the interferometer is connected to a port at a second side of the coupler; the data collection and processing module is connected to an output of the master detector; the coupler is configured to couple the excitation light signal fed back by the active phase-shifted grating array to the interferometer, and couple an optical signal reflected by the interferometer to the master detector; the master detector is configured to detect the optical signal reflected by the interferometer; and the data collection and processing module is configured to collect detection results of the master detector, and calculate an acoustic pressure of the acoustic signal.

Optionally, the data demodulation and processing device further comprises a polarization monitoring detector; an input of the polarization monitoring detector is connected to the port at the second side of the coupler; an output of the polarization monitoring detector is connected to the data collection and processing module; and the polarization monitoring detector is configured to obtain a polarization state in the interferometer based on the optical signal reflected by the interferometer, and send the polarization state in the interferometer to the data collection and processing module.

Optionally, the system further comprises a modulator, and the modulator is configured to modulate a forward pump light emitted by the forward pump source as the forward pump pulse.

Optionally, the data demodulation and processing device further comprises an amplifier, a filter, and a circulator; an input of the amplifier is connected to the wavelength division multiplexer; an output of the amplifier is connected to an input of the filter; an output of the filter is connected to a first port of the circulator; a second port of the circulator is connected to the port at the first side of the coupler; and a third port of the circulator is connected to one master detector.

Optionally, the system further comprises several cascaded structures that are connected in series; each of the cascaded structures comprises a beam combiner, an additional backward pump source, and a plurality of additional active phase-shifted gratings; the beam combiner is connected to the additional backward pump source; and a plurality of additional active phase-shifted gratings are connected between the beam combiners of two adjacent cascaded structures.

The present application has the following beneficial advantages. In the present application, the identical active phase-shifted grating array having a same excitation light wavelength is used to replace the existing normal fiber/passive identical weak fiber grating; and meanwhile, in terms of the light source, the pump source is used to replace the narrow-linewidth distributed feedback-fiber laser, and a forward pump source and a backward pump source are provided. The forward pump source may be a pulse pump source, or a forward pump light output by the forward pump source is modulated as a forward pump pulse by the modulator. Moreover, a backward pump light emitted by the backward pump source is a continuous light. When the pump pulse is incident to the active phase-shifted grating, the active phase-shifted grating may actively generate a high-coherence excitation light, and two adjacent active phase-shifted gratings are enabled to generate excitation light self-interference within a same pulse duration, thus an acoustic signal may be detected through phase demodulation. In the present application, the existing detection mode of passive reflected light interference is replaced. In this case, compared with Rayleigh scattering, the excitation light signal has great strength and high stability; and compared with the passive identical weak fiber grating, the excitation light wavelength in the present application may change with the environment, without generating voids. In this way, environmental adaptability is improved, and reliability and accuracy of the fiber distributed acoustic detection are improved.

BRIEF DESCRIPTION OF THE DRAWINGS

To more clearly describe the technical solutions of the embodiments of the present invention or in the prior art, the accompanying drawings used in the embodiments are briefly illustrated below. Apparently, the accompanying drawings in the description below are merely some embodiments of the present invention, and other accompanying drawings may also be obtained by one of ordinary skills in the art according to these accompanying drawings without creative effort.

FIG. 5($b$) is a linewidth frequency-domain spectrogram of an active phase-shifted grating excited by a single pump pulse, according to an embodiment of the present application.

DETAILED DESCRIPTION OF THE EMBODIMENTS

The technical solutions in the embodiments of the present invention are clearly and completely described below in combination with the accompanying drawings in the embodiments of the present invention. Obviously, the described embodiments are merely some embodiments of the present invention and are not all embodiments. According to the embodiments in the present invention, all other embodiments derived by one of ordinary skills in the art without creative effort fall into the protection scope of the present invention.

Figure 1:
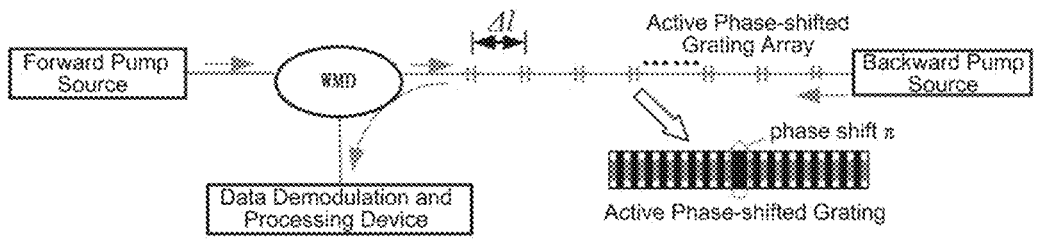
FIG. 1 is a schematic structural diagram of a fiber distributed acoustic sensing system according to an embodiment of the present application.

As shown in FIG. 1, an embodiment of the present application provides a fiber distributed acoustic sensing system. The system includes a forward pump source, a wavelength division multiplexer (WDM), an active phase-shifted grating array, a backward pump source, and a data demodulation and processing device. The pump source is a light source device for emitting a pump light. Directions of the pump light incident to the active phase-shifted grating array by the forward pump source and the backward pump source are opposite to each other. The active phase-shifted grating array include active phase-shifted gratings that are engraved on a same erbium doped fiber at an interval of $\Delta l$; that is, a distance between the gratings is $\Delta l$. All of the active phase-shifted gratings have a same excitation light wavelength. The active phase-shifted grating (herein, active phase-shifted fiber Bragg gratings, apsFBG) refers to a phase-shifted grating, which is engraved on the erbium doped fiber and used as a resonant cavity. The active phase-shifted grating has a phase shift of 7E, and when the pump light is incident to, the active phase-shifted grating may generate a high-coherence excitation light. The excitation light and the pump light have different wavelengths, and are coupled or decoupled by using the WDM.

Optionally, the forward pump source may be a pulse pump source. Alternatively, the system includes a modulator. The forward pump source is connected to the WDM by using the modulator, and the modulator is configured to modulate the forward pump light emitted by the forward pump source as a forward pump pulse. On the other hand, the backward pump light emitted by the backward pump source is a continuous light.

A beam of pump pulses having a pulse width of ω is incident into the active phase-shifted grating array, so that the active phase-shifted gratings are excited one by one in a time sequence. Each of the active phase-shifted gratings, when being excited, generates a forward excitation light and a backward excitation light at the same time. In a case that a theoretical length l of the forward pump pulse is greater than the distance Δl between the active phase-shifted gratings in the active phase-shifted grating array (where l=cw/2n$_f$, c represents a speed of light in vacuum, w represents a pulse width of the forward pump pulse, and n$_f$ represents a refractive index of the fiber), as illustrated in an example of the excitation light self-interference shown in FIG. 2, when a transmittance window of an i$^{th}$ active phase-shifted grating overlaps or partially overlaps with that of a (i+1)$^{th}$ active phase-shifted grating, the backward excitation light of the i$^{th}$ active phase-shifted grating may directly interfere with that of the (i+1)$^{th}$ active phase-shifted grating. As illustrated in an example of the excitation light self-interference shown in FIG. 3, when a transmittance window of an i$^{th}$ active phase-shifted grating does not overlap with that of a (i+1)$^{th}$ active phase-shifted grating, the (i+1)$^{th}$ active phase-shifted grating may be considered as a normal fiber grating, which is used as a grating reflector to reflect the forward excitation light of the i$^{th}$ active phase-shifted grating, so that the interference occurs between the forward excitation light and the backward excitation light of the i$^{th}$ active phase-shifted grating. Here, $1 < i \leq N$, where N represents a total number of the active phase-shifted gratings included in the active phase-shifted grating array.

Figure 2:
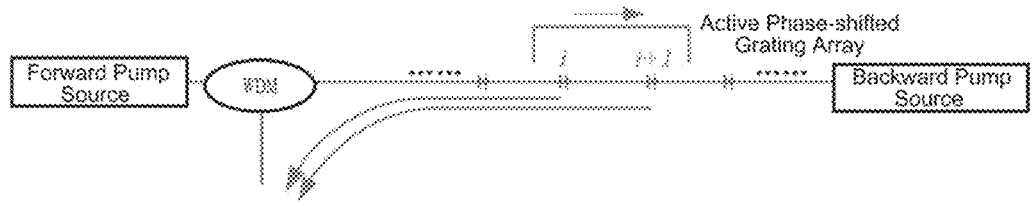
FIG. 2 is a schematic diagram of self-interference between two adjacent identical active phase-shifted gratings when transmittance windows of two adjacent active phase-shifted gratings overlap or partially overlap with each other, according to an embodiment of the present application.
Figure 3:
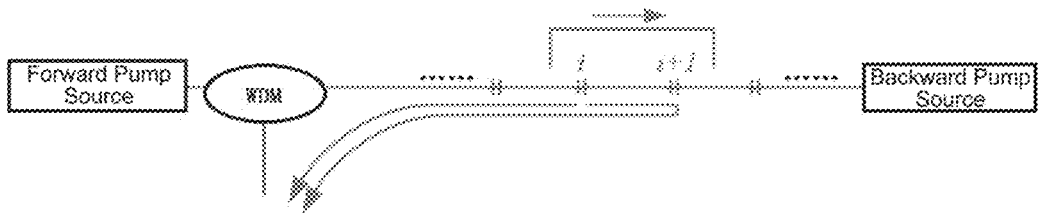
FIG. 3 is a schematic diagram of self-interference between two adjacent identical active phase-shifted gratings when transmittance windows of two adjacent active phase-shifted gratings do not overlap with each other, according to an embodiment of the present application.

It may be learned from FIG. 2 and FIG. 3 that, when the theoretical length l of the forward pump pulse is greater than the distance Δl between the active phase-shifted gratings in the active phase-shifted grating array, in the present application the excitation light self-interference is generated between two adjacent active phase-shifted gratings within a same pulse duration, given that the active phase-shifted gratings in the active phase-shifted grating array are identical or not identical. By means of such self-interference mechanism of the active phase-shifted grating array, it may be ensured that the interference can be occurred at any time. The term "identical" in this embodiment refers to that all of the active phase-shifted gratings in the active phase-shifted grating array are exactly the same.

The wavelength division multiplexer receives the forward pump pulse incident from the forward pump source, and transmits the forward pump pulse to the active phase-shifted grating array. The active phase-shifted grating array receives the forward pump pulse and the continuous backward pump light incident from the backward pump source, so that the forward excitation light and the backward excitation light are generated in each of the active phase-shifted gratings. Moreover, as shown in FIG. 2 or FIG. 3, two adjacent active phase-shifted gratings are enabled to generate the excitation light self-interference within the same pulse duration. The wavelength division multiplexer transmits an excitation light signal fed back by the active phase-shifted grating array to the data demodulation and processing device. The data demodulation and processing device is configured to perform interference detection on a fiber phase between two adjacent active phase-shifted gratings, so as to measure an acoustic signal acted on the fiber.

In the present application, the active phase-shifted grating array having the same excitation light wavelength is used to replace the existing normal fiber/passive identical weak fiber grating. Meanwhile, in terms of the light source, the pump source is used to replace the narrow-linewidth distributed feedback-fiber laser, and at the same time the forward pump source and the backward pump source are provided. When the pump pulse is incident to the active phase-shifted grating, the active phase-shifted grating may actively generate the high-coherence excitation light. In this case, the active phase-shifted grating is equivalent to a "light source" in the sensing fiber, which can actively generate the excitation light. Moreover, two adjacent active phase-shifted gratings are enabled to generate the excitation light self-interference within the same pulse duration. In this way, an acoustic pressure of the acoustic signal can be measured by the phase change in the fiber between the two adjacent active phase-shifted gratings, which is measured via the interference. In this solution, when compared with the Rayleigh scattering, the excitation light signal has great strength and high stability; and when compared with the passive reflected light interference mechanism of the passive identical weak fiber grating, the active excitation light interference mechanism is adopted in the present application so that the excitation light wavelength may change with the environment to prevent the voids. In this way, the environmental adaptability is improved, and the reliability and accuracy of the fiber distributed acoustic detection are improved.

A principle of the acoustic signal in this system is described below. An acoustic wave is actually a pressure wave, and a fiber located in a sound field may be subject to a pressure, that is, an acoustic pressure. When a beam of light is propagated in the fiber for a distance of L along an axial direction, a phase of the light wave Φ is:

$$\Phi = \frac{2\pi n_f L}{\lambda}$$

where n$_f$ represents a refractive index of the fiber, and λ represents a wavelength of the incident light. The phase of the light propagating in the fiber may change when the pressure acts on the fiber, and a phase change ΔΦ is:

$$\Delta\Phi = \frac{2\pi n_f}{\lambda} \cdot \Delta L + \frac{2\pi L}{\lambda} \cdot \Delta n_f$$

where ΔL represents a change in the fiber length that is caused by a strain generated by the pressure;

$$\frac{2\pi n_f}{\lambda} \cdot \Delta L$$

represents a phase shift caused by the change in the fiber length; Δn$_f$ represents a change in the refractive index that is caused by the elasto-optical effect of the fiber; and $$\frac{2\pi L}{\lambda} \cdot \Delta n_f$$

represents a phase shift caused by a change in the propagation constant.

For the phase shift caused by a change in the propagation constant, it may be obtained a change $\Delta\beta_m$ in an inverse dielectric tenser, which is expressed as:

$$\Delta\beta_m = \Delta\left(\frac{1}{n_f^2}\right)_m = QS$$

where Q represents an elasto-optical coefficient matrix; and S represents a strain component of the fiber, that is, a strain in each direction of the fiber. When not being subject to a stress, the fiber is an isotropic medium and has six movement dimensions; and the elasto-optical coefficient matrix Q is expressed as:

$$Q = \begin{bmatrix} p_{11} & p_{12} & p_{12} & 0 & 0 & 0 \\ p_{12} & p_{11} & p_{12} & 0 & 0 & 0 \\ p_{12} & p_{12} & p_{11} & 0 & 0 & 0 \\ 0 & 0 & 0 & p_{44} & 0 & 0 \\ 0 & 0 & 0 & 0 & p_{44} & 0 \\ 0 & 0 & 0 & 0 & 0 & p_{44} \end{bmatrix}$$

where $p_{44}=\frac{1}{2}(p_{11}-p_{12})$ and $p_{11}$, $p_{12}$, and $p_{44}$ are components of the elasto-optical coefficient matrix.

When the fiber is subject to the acoustic pressure P, a strain component S of the fiber may be expressed as:

$$S = \begin{bmatrix} S_1 \\ S_2 \\ S_3 \\ S_4 \\ S_5 \\ S_6 \end{bmatrix} = \begin{bmatrix} -(1-\mu)P/E \\ -(1-\mu)P/E \\ 2\mu P/E \\ 0 \\ 0 \\ 0 \end{bmatrix}$$

where S1 to S6 represent six strain components corresponding to the elasto-optical coefficient matrix Q, E represents the Young's modulus of the fiber, and $\mu$ represent the Poisson's ratio of the fiber. Therefore, the change $\Delta\beta_m$ in the inverse dielectric tenser may be expressed as:

$$\begin{bmatrix} \Delta\beta_1 \\ \Delta\beta_2 \\ \Delta\beta_3 \\ \Delta\beta_4 \\ \Delta\beta_5 \\ \Delta\beta_6 \end{bmatrix} = \begin{bmatrix} p_{11} & p_{12} & p_{12} & 0 & 0 & 0 \\ p_{12} & p_{11} & p_{12} & 0 & 0 & 0 \\ p_{12} & p_{12} & p_{11} & 0 & 0 & 0 \\ 0 & 0 & 0 & p_{44} & 0 & 0 \\ 0 & 0 & 0 & 0 & p_{44} & 0 \\ 0 & 0 & 0 & 0 & 0 & p_{44} \end{bmatrix} \begin{bmatrix} -(1-\mu)P/E \\ -(1-\mu)P/E \\ 2\mu P/E \\ 0 \\ 0 \\ 0 \end{bmatrix}$$

According to a relational expression $$\Delta n_m = -\frac{n_f^3}{2}\Delta\beta_m,$$

where $\Delta n_m$ represents a change in the refractive index of the fiber that is caused by the change in the inverse dielectric tenser in a certain movement direction, and where m=1 to 6, it may be obtained that the change in the refractive index satisfies:

$$\Delta n_1 = \Delta n_2 = \frac{n_f^3 P}{2E}[(1-\mu)p_{11} + (1-3\mu)p_{12}]$$

where $\Delta n_1$ represents a change in the refractive index that corresponds to a first dimension, and $\Delta n_2$ represents a change in the refractive index that corresponds to a second dimension. Because the light is propagated along the axial direction, an overall change $\Delta n_f$ in the refractive index is: $\Delta n_f=\Delta n_1+\Delta n_2$.

Moreover, because a strain, in the axial direction, of the fiber is $S_3=2\mu P/E$, a change in the fiber length is $\Delta L=2L\mu P/E$. Therefore, it is obtained that the phase change $\Delta\Phi$ is:

$$\Delta\Phi = \frac{\pi LP}{\lambda E}[n_f^3(1-\mu)p_{11} + n_f^3(1-3\mu)p_{12} + 4n_f\mu]$$

For a silica fiber, in which $p_{11}=0.13$, $p_{12}=0.28$, $n_f=1.46$, $E=7.2\times10^{10}$ N/m$^2$, $\mu=0.17$, and $\lambda=1550$ nm, a response relationship between a phase change $\Delta\Phi_L$ in a unit length of the fiber and the acoustic pressure P is:

$$\Delta\Phi_L = \frac{\Delta\Phi}{L} = 4.942\times10^{-5}P \text{ (rad)}$$

Therefore, in the data demodulation and processing device, the phase change in the fiber between two adjacent identical active phase-shifted gratings is obtained through phase demodulation. That is, the acoustic pressure of the acoustic signal may be measured. A basis principle of the phase demodulation is that: during a process in which the light wave is propagated in an energy field, phase change occurs in a section of the sensitive single-mode fiber, and thus by using the function of the measured energy field and the interference detection technology, the phase change is converted into a light intensity change, thereby restoring the physical quantity of the acoustic pressure that needs to be detected.

Figure 4:
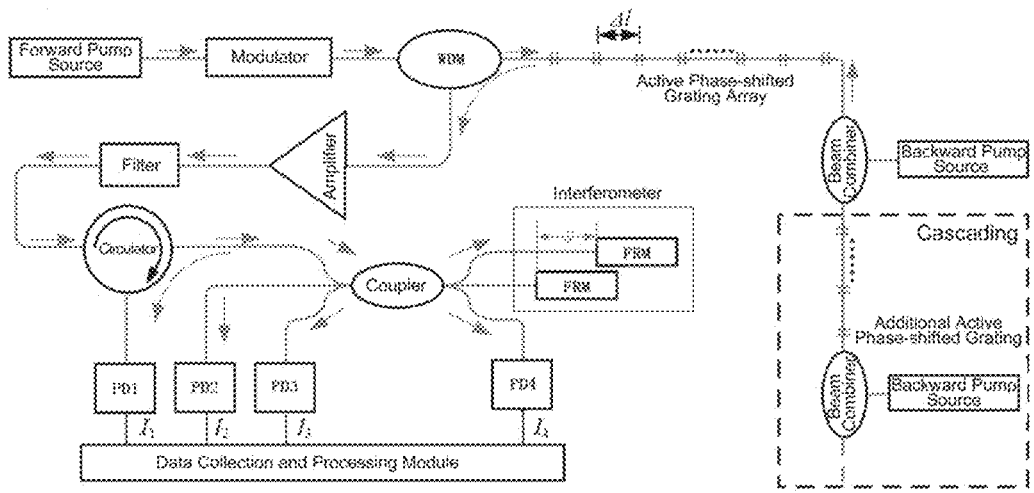
FIG. 4 is a schematic structural diagram of a fiber distributed acoustic sensing system according to another embodiment of the present application.

As shown in FIG. 4, another embodiment of the present application provides a fiber distributed acoustic sensing system. On the basis of the foregoing system structure, the data demodulation and processing device includes a coupler, an interferometer, three master detectors, and a data collection and processing module. An input end of the master detector is connected to a port at a first side of the coupler. The interferometer is connected to a port at a second side of the coupler. The data collection and processing module is connected to an output of the master detector. The coupler is configured to couple the excitation light signal fed back by the active phase-shifted grating array to the interferometer, and couple an optical signal reflected by the interferometer to the master detector. The master detector is configured to measure an optical signal reflected by the interferometer. The data collection and processing module is configured to collect detection results of the master detector, and calculate the acoustic pressure of the acoustic signal. The interferometer in this embodiment includes two Faraday rotator mirrors (FRMs) that represent a sensing arm and a reference arm of the interferometer, respectively. The two FRMs are connected to the coupler by using two fibers having different lengths. A difference between the fiber lengths is S, that is, a difference between half-arm lengths is S, and thus a Michelson interferometer is constructed. The polarization state of the interference light beam randomly fluctuates in the interferometer, and the signal attenuation caused by the polarization may be eliminated by using an FRM reflector.

To resolve the polarization attenuation problem that easily occurs in the conventional phase demodulation process, as an optional solution of this embodiment, the data demodulation and processing device further includes a polarization monitoring detector. An input of the polarization monitoring detector is connected to the port at the second side of the coupler. An output of the polarization monitoring detector is connected to the data collection and processing module. The polarization monitoring detector is configured to obtain a polarization state in the interferometer based on the optical signal reflected by the interferometer, and send the polarization state in the interferometer to the data collection and processing module.

In FIG. 4, an example of using three master detectors is given. The three master detectors are PD1, PD2, and PD3, respectively, and accordingly a 3×3 coupler is used. The first side (the left side in FIG. 4) of the 3×3 coupler includes three ports, which are connected to inputs of PD1, PD2, and PD3, respectively. Outputs of PD1, PD2, and PD3 are connected to the data collection and processing module, respectively. PD1 to PD3 and the interferometer are located at two sides of the 3×3 coupler, respectively. The optical signal reflected by the interferometer enter the three detectors from the 3×3 coupler, respectively. The second side (the right side in FIG. 4) of the 3×3 coupler also includes three ports, which are connected to the first FRM and the second FRM of the Michelson interferometer and an input of PD4, respectively. An output of PD4 is connected to the data collection and processing module. The interferometer and PD4 are located at the same side of the 3×3 coupler. PD4 is equivalent to a polarization monitoring window, which dynamically monitors the polarization in the interferometer to provide control information for polarization feedback. By monitoring the polarization, the polarization in the interferometer is guided, and thus the problem of polarization attenuation is avoided, thereby ensuring reliability and accuracy of the fiber distributed acoustic detection.

As an optional solution of this embodiment, the data demodulation and processing device further includes an amplifier, a filter, and a circulator. The amplifier is configured to amplify the excitation light signal of the active phase-shifted grating array. The filter is configured to filter the amplified excitation light signal to facilitate the subsequent phase demodulation. It should be noted that in this embodiment, the signal may be processed by using other types of elements according to actual application requirements. For the functions and applications of the signal processing elements such as an amplifier and a filter, reference may be made to the prior art, and details are omitted in this embodiment. The circulator is a multi-port component, which enables the signal to be transmitted circularly in a single direction, while a reverse direction is isolated. An input of the amplifier is connected to the WDM, and an output of the amplifier is connected to an input of the filter. An output of the filter is connected to a first port of the circulator. A second port of the circulator is connected to a port at the first side of the coupler; and a third port of the circulator is connected to one master detector.

In FIG. 4, the excitation light signal, after entering the data demodulation and processing device from the WDM, sequentially passes through the amplifier, the filter, and the first port of the circulator, and then enters the coupler from the second port of the circulator, and after passing through the coupler, enters the interferometer and PD4, respectively.

For the optical signal reflected by the interferometer, a first branch of the signal enters PD1 from a first port at the first side of the coupler and the third port of the circulator, a second branch of the signal enters PD2 from a second port at the first side of the coupler, and a third branch of the signal enters PD3 from a third port at the first side of the coupler. The present application relates to an interference-type fiber distributed acoustic sensing system. By using the passive phase demodulation mode based on the 3×3 fiber coupler shown in FIG. 4, a change in the light wave phase is converted into a change in the light wave intensity, and thus non-zero-difference phase demodulation may be implemented, having advantages of large measurement scope, direction determining facilitation, high sensitivity, and full fiberization realization, and the like. PD1, PD2, and PD3 detect the intensity of the output light waves of the three ports at the first side of the 3×3 coupler, respectively, and send detection results $I_1$, $I_2$, and $I_3$ to the data collection and processing module, respectively. The data collection and processing module collects $I_1$, $I_2$, and $I_3$, and process and calculate data to obtain detection data of the acoustic pressure. It is noted that the passive phase demodulation mode based on the 3×3 fiber coupler is existing, and a person skilled in the art can refer to the disclosure in the prior art to obtain related technical content, and thus details are omitted in this embodiment.

Because losses exist in the forward pump pulse and the backward pre-pump, a single backward pump source can accommodate a limited number of active phase-shifted gratings. As a result, the distance that can be detected by the system is limited. In this regard, in an optional solution of this embodiment, the capacity of the active phase-shifted gratings in the array is expanded by using a cascading manner. Refer to FIG. 4 for details, the system further includes several cascaded structures that are connected in series. Each of the cascaded structures includes a beam combiner, an additional backward pump source, and a plurality of additional active phase-shifted gratings. The beam combiner is connected to the additional backward pump source, and a plurality of additional active phase-shifted gratings are connected between the beam combiners of two adjacent cascaded structures. In a single cascaded structure of the present application, a plurality of active phase-shifted gratings are connected to a beam combiner and the plurality of gratings correspond to a backward pump source. By using a mode of continuously cascading and connecting in series, more gratings and backward pump sources are added to the active phase-shifted grating array, thereby expanding the capacity of the active phase-shifted gratings in the array and prolonging the distance that can be monitored by the system.

Figure 5A:
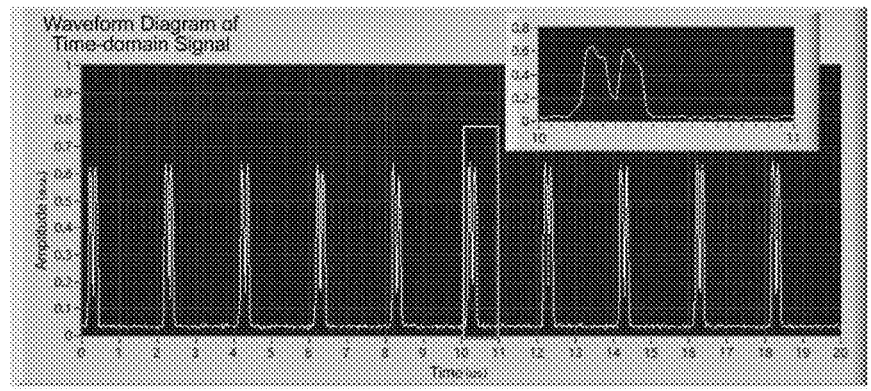
FIG. 5($a$) is a waveform diagram of a time-domain signal when an active phase-shifted grating array is excited by a pump pulse, according to an embodiment of the present application.
Figure 5B:
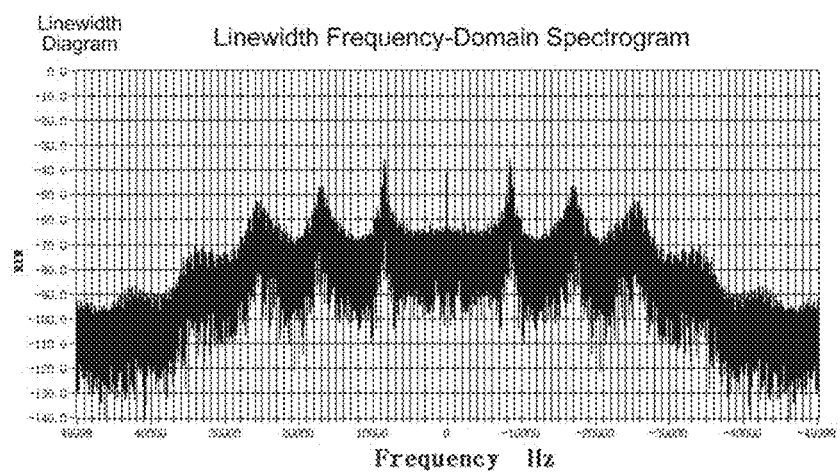

The pulse excitation characteristic of the active phase-shifted grating array is verified in this embodiment. Two identical active phase-shifted gratings are connected, and a distance therebetween is 5 m. Two pump sources whose excitation light wavelengths are 1480 nm are used as the forward pump source and the backward pump source, respectively. A repetition frequency of the forward pulse pump is 500 kHz, and a pulse width thereof is 50 ns. By adjusting the concentration of erbium ions in the fiber, and balancing the pump and self-pulsating effects, as shown in FIG. 5(a) and FIG. 5(b), it is verified that the identical active phase-shifted grating array can achieve pulse excitation and keep a narrow linewidth characteristic. A single pulse has a linewidth of about 50 kHz, which can satisfy requirements for the interference detection, thus implementing the acoustic detection.

In this embodiment, the active phase-shifted grating array having the same excitation light wavelength is used in the present application to replace the existing normal fiber/passive identical weak fiber grating. Meanwhile, in terms of the light source, the forward pump source and the backward pump source are used to replace the narrow-linewidth distributed feedback-fiber laser to achieve active excitation light interference. The self-interference mechanism of the active phase-shifted grating array can ensure that interference can occur at any time. Moreover, the excitation light signal has great strength and high stability, and has no voids as compared with a conventional passive reflected-light interference mode, thereby ensuring that external sound field signals can be collected and demodulated. In this way, reliability and accuracy of the fiber distributed acoustic detection are improved, and environmental adaptability becomes higher. Performing polarization monitoring by using PD4 can dynamically monitor the polarization state in the interferometer, preventing the interferometer from polarization attenuation during a phase demodulation process. The capacity of the active phase-shifted gratings in the array is expanded by means of cascading, thus achieving a long-distance acoustic detection.

It should be noted that on the basis of the system structure shown in FIG. 1, a specific structure of the data demodulation and processing device is not limited to FIG. 4. In actual applications, the signal processing element, the interferometer, the related devices for phase demodulation can be selected, added, replaced, or combined. In this embodiment, for functions, principles, and working modes of all elements in the data demodulation and processing device, reference may be made to the relevant prior art.

A person skilled in the art would easily conceive of other implementation solutions of the present invention after considering the specification and practicing the invention disclosed herein. The present application is intended to cover any variations, uses, or adaptive changes of the present invention. These variations, uses, or adaptive changes follow the general principle of the present invention and include the common general knowledge or common technical means in this technical filed that is not disclosed in the present invention. The specification and the embodiments are merely considered as exemplary, and the actual scope and spirit of the present invention are indicated in the appended claims.

It should be understood that the present invention is not limited to the exact structure that is described above and is shown in the figures, and various modifications and changes can be made thereto, without departing from the scope thereof. The scope of the present invention is merely limited by the appended claims.

What is claimed is:

1. A fiber distributed acoustic sensing system, comprising a forward pump source, a wavelength division multiplexer, an active phase-shifted grating array, a backward pump source, and a data demodulation and processing device, wherein the wavelength division multiplexer is configured to receive a forward pump pulse incident from the forward pump source, transmit the forward pump pulse to the active phase-shifted grating array, and transmit an excitation light signal fed back by the active phase-shifted grating array to the data demodulation and processing device;

the active phase-shifted grating array comprises several active phase-shifted gratings that are engraved on a same fiber, each active phase-shifted grating having a same excitation light wavelength;

the active phase-shifted grating array is configured to receive the forward pump pulse and a backward pump light incident from the backward pump source, so that a forward excitation light and a backward excitation light are generated in each of the active phase-shifted gratings, and two adjacent active phase-shifted gratings are enabled to generate excitation light self-interference within a same pulse duration; and the data demodulation and processing device is configured to perform interference detection on a fiber phase between two adjacent active phase-shifted gratings to measure an acoustic signal acted on the fiber.

2. The system according to claim 1, wherein a theoretical length l of the forward pump pulse is greater than a distance $\Delta l$ between each of the active phase-shifted gratings in the active phase-shifted grating array, where $l=cw/2n_f$, c represents a speed of light in vacuum, w represents a pulse width of the forward pump pulse, and $n_f$ represents a refractive index of the fiber.

3. The system according to claim 2, wherein the excitation light self-interference comprises that:

when a transmittance window of an $i^{th}$ active phase-shifted grating overlaps or partially overlaps with that of a $(i+1)^{th}$ active phase-shifted grating, the backward excitation light of the $i^{th}$ active phase-shifted grating interferes with that of the $(i+1)^{th}$ active phase-shifted grating, where $1<i\leq N$, and N represents a total number of the active phase-shifted gratings included in the active phase-shifted grating array.

4. The system according to claim 2, wherein the excitation light self-interference comprises that:

when a transmittance window of an $i^{th}$ active phase-shifted grating does not overlap with that of a $(i+1)^{th}$ active phase-shifted grating, the backward excitation light of the $i^{th}$ active phase-shifted grating interferes with the forward excitation light of the $i^{th}$ active phase-shifted grating reflected by the $(i+1)^{th}$ active phase-shifted grating, where $1<i\leq N$, and N represents a total number of the active phase-shifted gratings included in the active phase-shifted grating array.

5. The system according to claim 1, wherein the data demodulation and processing device comprises a coupler, an interferometer, three master detectors, and a data collection and processing module; an input of the master detector is connected to a port at a first side of the coupler; the interferometer is connected to a port at a second side of the coupler; the data collection and processing module is connected to an output of the master detector; the coupler is configured to couple the excitation light signal fed back by the active phase-shifted grating array to the interferometer, and couple an optical signal reflected by the interferometer to the master detector; the master detector is configured to detect the optical signal reflected by the interferometer; and the data collection and processing module is configured to collect detection results of the master detector, and calculate an acoustic pressure of the acoustic signal.

6. The system according to claim 5, wherein the data demodulation and processing device further comprises a polarization monitoring detector; an input of the polarization monitoring detector is connected to the port at the second side of the coupler; an output of the polarization monitoring detector is connected to the data collection and processing module; and the polarization monitoring detector is configured to obtain a polarization state in the interferometer based on the optical signal reflected by the interferometer, and send the polarization state in the interferometer to the data collection and processing module.

7. The system according to claim 5, wherein the data demodulation and processing device further comprises an amplifier, a filter, and a circulator; an input of the amplifier is connected to the wavelength division multiplexer; an output of the amplifier is connected to an input of the filter; an output of the filter is connected to a first port of the circulator; a second port of the circulator is connected to the port at the first side of the coupler; and a third port of the circulator is connected to one master detector.

8. The system according to claim 1, wherein the system further comprises a modulator, and the modulator is configured to modulate a forward pump light emitted by the forward pump source as the forward pump pulse.

9. The system according to claim 1, wherein the system further comprises several cascaded structures that are connected in series; each of the cascaded structures comprises a beam combiner, an additional backward pump source, and a plurality of additional active phase-shifted gratings; the beam combiner is connected to the additional backward pump source; and a plurality of additional active phase-shifted gratings are connected between the beam combiners of two adjacent cascaded structures.

* * * * *